United States Patent [19]
Sano et al.

[11] Patent Number: 5,097,699
[45] Date of Patent: Mar. 24, 1992

[54] METHOD AND SYSTEM FOR TESTING AUTOMOTIVE POWER TRANSMISSION AND ANALYZING ENGINE OUTPUT CHARACTERISTIC USING DYNAMOMETER

[75] Inventors: Kaoru Sano; Fumio Mizushina; Takashi Goto; Toshimitsu Maruki, all of Shizuoka; Yukio Naganuma, Tokyo, all of Japan

[73] Assignee: Kabushiki Kaisha Meidensha, Tokyo, Japan

[21] Appl. No.: 618,951

[22] Filed: Nov. 28, 1990

[30] Foreign Application Priority Data

Nov. 30, 1989 [JP] Japan .................................. 1-310889
Dec. 26, 1989 [JP] Japan .................................. 1-337538

[51] Int. Cl.$^5$ .......................................... G01M 19/00
[52] U.S. Cl. .............................................. 73/118.1
[58] Field of Search .................. 73/116, 118.1, 862.09

[56] References Cited

U.S. PATENT DOCUMENTS 4,356,724 11/1982 Ayoub et al. ...................... 73/118.1
4,823,596 4/1989 Meyers et al. ..................... 73/118.1

FOREIGN PATENT DOCUMENTS 0366446 5/1990 European Pat. Off. .

*Primary Examiner*—Jerry W. Myracle
*Attorney, Agent, or Firm*—Ronald P. Kananen

[57] ABSTRACT

A system and method for testing a specimen such as a vehicular power transmission (e.g., an automatic transmission) and analyzing an engine output characteristic of an engine connected to the power transmission in which at least a first revolutional speed on an input or output shaft of the power transmission and a first output torque of the power transmission are measured when the engine operating parameters indicate a predetermined value with the power transmission connected to the engine. A second revolutional speed on the input or output shaft of the power transmission and a second output torque of the power transmission are measured when a low inertia driving unit having the same characteristics as the engine is connected any driven with a power transmission under the same operating parameters described above. A first drive torque of the low inertia driving unit is then measured, a third revolutional speed on the input or output shaft of the power transmission and a third output torque of the power transmission are measured when a predetermined time has passed and when the same low inertia driving unit is connected and driven in the same way, and a second drive torque of the lower inertia driving unit is measured when difference values between the second and third revolutional speeds and second and third output torque fall within a predetermined range. The second drive torque is estimated as the output characteristic of the engine connected to the power transmission.

17 Claims, 7 Drawing Sheets

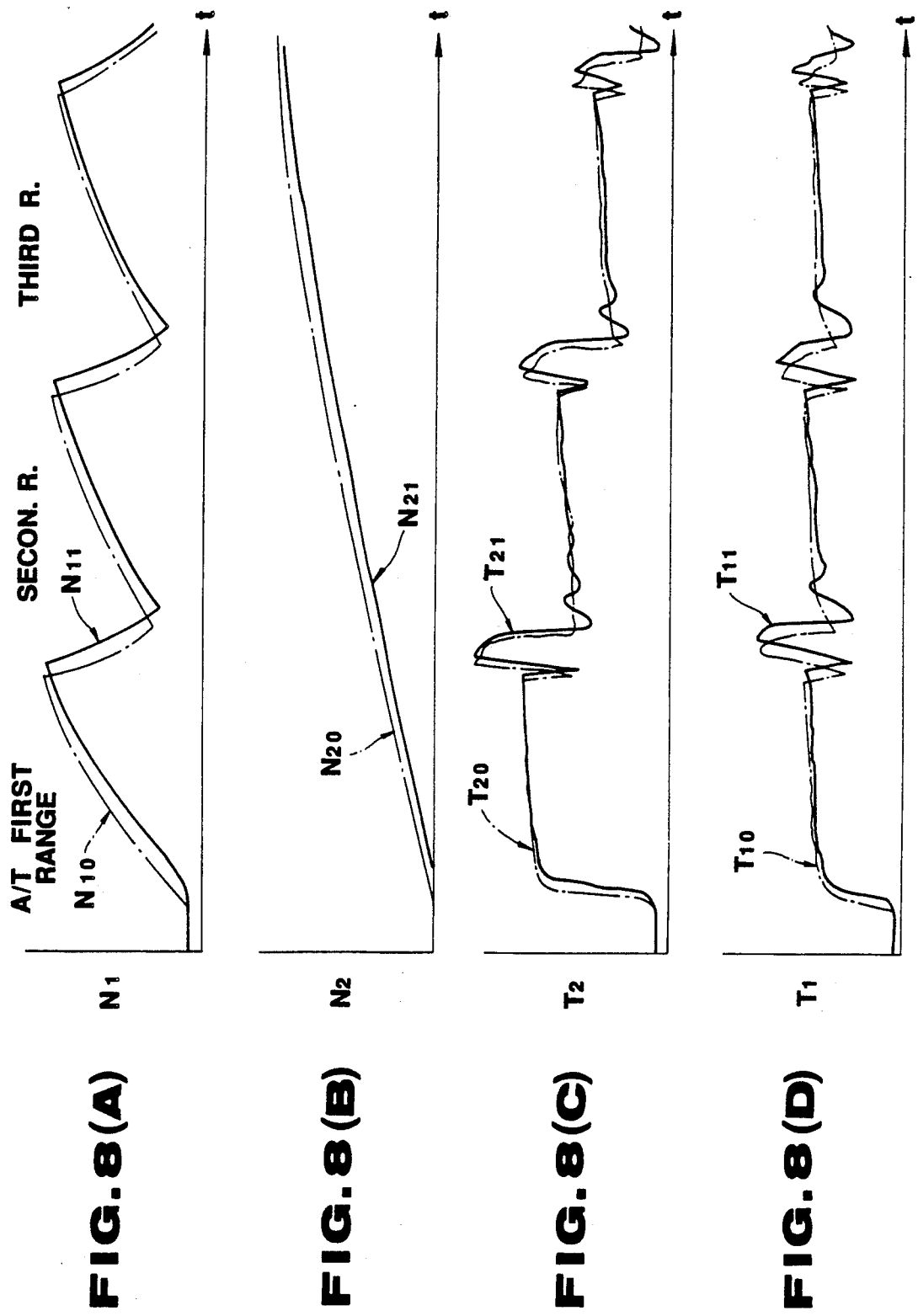

METHOD AND SYSTEM FOR TESTING AUTOMOTIVE POWER TRANSMISSION AND ANALYZING ENGINE OUTPUT CHARACTERISTIC USING DYNAMOMETER

BACKGROUND OF THE INVENTION

(1) Field of the Invention

The present invention relates to a method and system for testing a specimen such as an automatic power transmission of a vehicle and analyzing an engine output characteristic (for example, an input torque of the power transmission) via the specimen to be tested using a dynamometer (i.e., a low inertia driving unit). The present invention, more particularly, relates to the method and system in which the engine output characteristic is estimated using, e.g., a low inertia driving unit when testing since the engine output characteristic cannot actually be measured in a system in which the engine and specimen are connected together.

(2) Background of the Art

It is necessary to grasp an engine output characteristics in analyzing and evaluating characteristics of power transmissions to be installed in automotive vehicles and for general troubleshooting for automatic transmissions. Therefore, although testing is carried out with the automotive power transmission as a specimen connected to a vehicular engine, it is difficult in construction to insert a torque meter between the engine and the power transmission. Consequently, an accurate measurement of torque of an input shaft of the power transmission cannot be made. To cope with such a problem described above, the engine output characteristic data supplied from an engine manufacturer has been used when evaluating a performance of the power transmission.

However, since it cannot be accurately determined whether the actual output of the engine connected to the power transmission coincides with the derived output characteristic data, high reliability cannot rest on the obtained result.

In addition, in transient performance testing of the power transmission, with a specimen power transmission connected to an engine, output control of the engine is carried out to test acceleration/deceleration endurance and gear shift 'feel' of the power transmission.

In such an engine driving method as described above, it is difficult to repeatedly reproduce the same engine operating conditions. Consequently, a motor driving method has been adopted. In a transient dynamometer used in the motor driving method, a low inertia driving unit having a low inertia equal to or more than that of the engine and the same output characteristic transient is used to realize a large change of speed during gear shift operation.

FIG. 9 shows a previously proposed transient dynamometer (as shown in a U.S. patent application Ser. No. 427,031 filed on Oct. 25, 1989), now U.S. Pat. No. 5,060,176.

The low inertia driving unit (TR-DY) 1 includes a low inertia DC motor and a speed governor. The DC motor performs a torque control or speed control as a current control minor loop of a thyristor reonard method to obtain a low inertia output equal to or more than the engine. An axial output of the drive unit 1 provides a drive source for a specimen of a power transmission (AT) 3 via an axial torque meter 2. The axial output of the specimen automatic transmission (AT) 3 serves as a driving force for an energy absorbing dynamometer (DY) 5 and flywheel 5A via a torque meter (TM) 4. The low inertia driving unit 1, specimen automatic transmission 3, and energy absorbing dynamometer 5 are respectively provided with self-contained control units 6, 7, and 8.

The TR-DY control unit 6 carries out a torque or speed control of the low inertia driving unit 1 in response to a torque or speed command. In the torque control, a feedback control is carried out by comparing the torque command derived from an engine characteristic generator 9 with the detected torque $T_1$ of the torque meter 2. On the other hand, for speed control, feedback control is carried out by comparing the speed command with the detected speed $N_1$ of the speed detector 10.

The engine characteristic generator 9 constituted by a microcomputer has a data such that an actual engine output torque T versus speed N characteristic is set or measured for each opening angle $\theta_i$ of an engine throttle valve. Then, the engine characteristic generator 9 derives a torque to be output by the low inertia drive unit 1 from the input opening angle of the throttle valve and from the speed detected value $N_1$ so as to provide the torque command output. It is noted that although the opening angle of the throttle valve $\theta_i$ can be used in place of an engine intake negative pressure, the opening angle of the throttle valve $\theta_i$ is herein used.

In the previously proposed transient dynamometer, the engine characteristic generator 9 carries out data collection through an analysis of the actual engine output characteristic.

In order to coincide with a behavior of an actual vehicle during the analysis of the engine output characteristic, a testing arrangement may be considered in which the torque meter, energy absorbing dynamometer, and flywheel (both absorbing dynamometer and flywheel providing a pesudo load to the power transmission) are connected to the power transmission (refer to FIG. 1 (B)). However, it is difficult to directly measure the output characteristic (torque output $T_1$) by means of the action of a torque converter of the automatic transmission. Therefore, a method for measuring the engine output from the torque meter in a shifted state of a four-speed (gear shift ratio of 1:1) manual transmission with a manual transmission connected in place of an automatic transmission has been adopted. However a manual transmission which matches the engine is not always prepared. Actually, it is often impossible to accurately measure the engine output characteristic.

As described above, although the output characteristic data for the engine itself derived from the engine manufacturer may be used, the data may be different from the actual output characteristic data with the automatic transmission and load connected.

SUMMARY OF THE INVENTION

It is an object of the present invention to provide a reliable method and system for testing a specimen of such automotive power transmission and analyzing an engine output characteristic, i.e., output torque (output shaft torque) which can achieve analysis and evaluate characteristics of the specimen on the basis of tested data on output shaft torque of the power transmission and input/output shaft revolutional speed of the power transmission to obtain a highly reliable result without directly measuring the engine torque output.

The above-described object can be achieved by providing a method for testing an engine output characteristic of an engine connected with a vehicular power transmission, comprising the steps of: (a) measuring an engine operating parameter: (b) measuring at least a first revolutional speed on an input or output shaft of a power transmission connected to the engine and a first output torque of the power transmission when the engine operating parameter indicates a predetermined value: (c) measuring a second revolutional speed on the input or output shaft of the power transmission and second output torque of the power transmission when a low inertia driving unit having the same characteristic as the engine is connected and driven with the power transmission under the same operating parameter measured in the step (a); (d) measuring a first drive torque of the low inertia driving unit in the state of step (c); (e) measuring a third revolutional speed on the input or output shaft of the power transmission and a third output torque of the power transmission when a predetermined time has elapsed after the step (c) and the same low inertia driving unit is connected and driven in the same way as the step (c); and (f) measuring a second drive torque of the low inertia driving unit when a difference in the values of the second and third revolutional speeds and second and third output torques fall within a predetermined range, the second drive torque being estimated as the output characteristic of the engine connected to the power transmission.

The above-described object can also be achieved by providing a system for testing an output characteristic of an engine connected with a vehicular power transmission, comprising: (a) first means for measuring an engine operating parameter; (b) second means for measuring at least a first revolutional speed on an input or output shaft of a power transmission connected to the engine and a first output torque of the power transmission when the engine operating parameter indicates a predetermined value; (c) third means for measuring a second revolutional speed on the input or output shaft of the power transmission and a second output torque of the power transmission when a low inertia driving unit having the same characteristic as the engine is connected and driven with the power transmission under the same operating parameter measured in the step (a); (d) fourth means for measuring a first drive torque of the low inertia driving unit in the state of step (c); (e) fifth means for measuring a third revolutional speed on the input or output shaft of the power transmission and a third output torque of the power transmission when a predetermined time has elasped after the step (c) and the same low inertia driving unit is connected and driven in the same way as the step (c); and (f) sixth means for measuring a second drive torque of the low inertia driving unit when a difference in the values of the second and third revolutional speeds and second and third output torques fall within a predetermined range, the second drive torque being estimated as the output characteristic of the engine connected to the power transmission.

BRIEF DESCRIPTION OF THE DRAWINGS

FIG. 1 (B) is a schematic block diagram of a testing arrangement used in a second preferred embodiment according to the present invention.

FIGS. 8 (A) through 8 (D) are waveform charts of accelerations in a case when an ASR driving by means of a transient dynamometer in the second preferred embodiment is carried out.

DETAILED DESCRIPTION OF THE PREFERRED EMBODIMENTS

Reference will hereinafter be made to the drawings in order to facilitate a better understanding of the present invention.

Figure 1A:
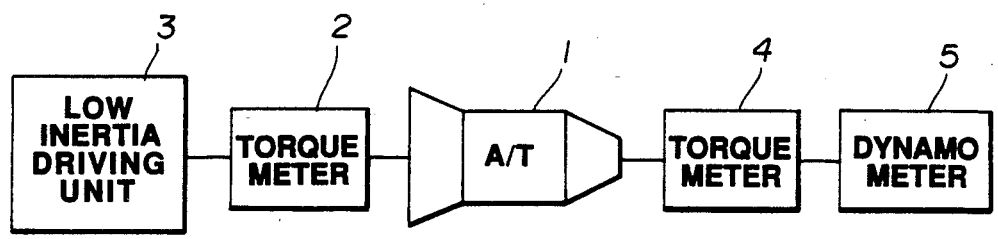
FIG. 1 (A) is a schematic block diagram of a system used for testing a specimen such as a vehicular automatic transmission and analyzing an engine output characteristic in a first preferred embodiment according to the present invention.
Figure 1B:
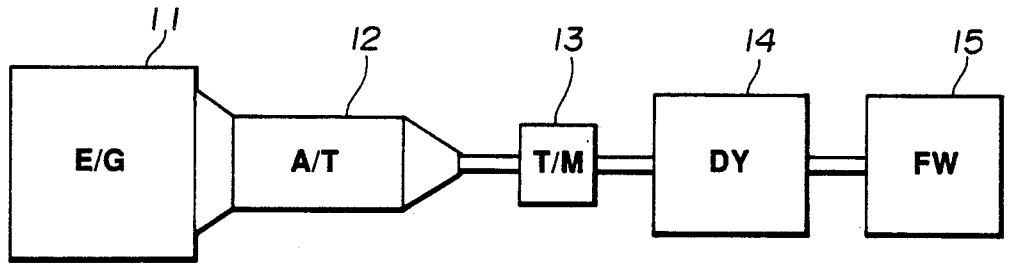

FIG. 1 (A) shows a testing system for a specimen such as a vehicular power transmission to analyze an engine output characteristic in a first preferred embodiment according to the present invention.

A low inertia driving unit 3 is connected to an input portion of a specimen of a power transmission (e.g., an automatic transmission) 1. An energy absorbing dynamometer 5 is connected to an output portion of the power transmission 1 via a torque meter 4. The low inertia driving unit 3 is a driving unit in which a DC motor is used to provide a low inertial force with an axial rigidity taken into special consideration and to provide inertia equal to an engine. The structure of the low inertia driving unit 3 has been explained in the background of the invention.

A procedure in which the output characteristic of the engine is derived from a system in which the engine is connected to a specimen power transmission will be described below.

First, two types of reference data are prepared, these reference data being data $T_{20}(t)$ representing a change of an output shaft torque of the power transmission 1 with time for each opening angle of the engine throttle valve and data $N_{10}(t)$ representing a change of the input shaft revolutional speed of the power transmission 1 with time for each opening angle of the engine throttle valve. Both reference data are derived from the system in which the engine is connected to the power transmission (refer to FIG. 1 (B)) or derived from a case wherein the engine is connected to the power transmission and installed in a vehicle and is actually driven on a road.

Next, with the testing arrangement shown in FIG. 1 (A), a data $T_{10}(t)$*1 which would output the data $T_{20}$ and $N_{10}$ on the basis of a certain throttle valve opening angle θ is calculated from a shift gear ratio and/or a predictive slip rate and supplied to the low inertia driving unit 3 as a torque command. Thus, the testing system shown in FIG. 1 (A) is prepared.

It is noted that *1 of the symbol $T_{10}(t)*1$ denotes a first target value of the input shaft torque of the power transmission.

Initially derived at the first time of testing is data representing a change of the output shaft torque of the power transmission with time is $T_{21}(t)$, data representing a change of input shaft revolutional speed with time is $N_{11}(t)$. Values of $T_{21}(t)$ and $N_{11}(t)$ at time $t_k$ (k denotes an integer) are represented by $T_{21}(t_k)$ and $N_{11}(t_k)$.

Figure 2:
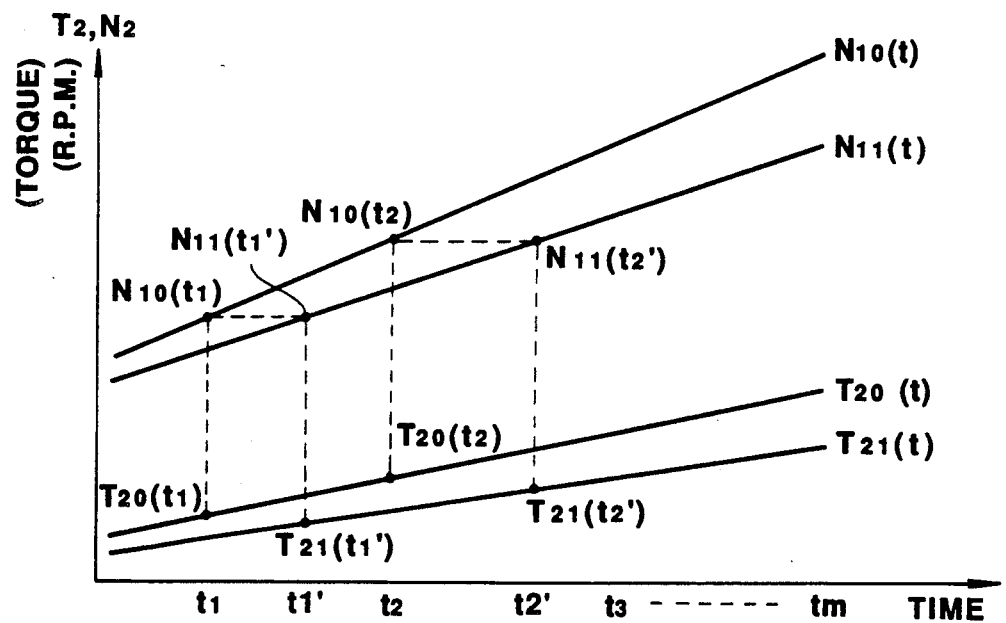
FIG. 2 is an explanatory view for explaining a learning operation carried out for the system shown in FIG. 1.

FIG. 2 shows a characteristic graph representing the reference data and first data. The subsequent procedure will be described with reference to FIG. 2.

$t_1'$ is derived, which outputs $N_{11}(t_1')$ of the same frequency as $N_{10}(t_1)$ at the time $t_1$. Next, $T_{21}(t_1')$ at the subsequent time $t_1'$ is derived to compare $T_{20}(t_1)$ with $T_{21}(t_1')$. If the $T_{10}(t)*1$ command input when deriving the first data coincides with the input shaft torque $T_{10}(t)$ of the specimen transmission, $T_{20}(t_1)$ coincides with $T_{21}(t_1')$. If they do not coincide with each other, $T_{21}(t_1)$ is different from $T_{21}(t_1')$. That is to say, a difference between $T_{20}(t_1)$ and $T_{21}(t_1')$ at the time $t_1$ provides an index for $T_{10}(t_1)*1$ to be deviated from $T_{10}(t_1)$.

Then, $\Delta T_{21}(t_1)$ is defined in the following equation (1):

$$\Delta T_{21}(t_1) = T_{20}(t_1) - T_{21}(t_1') \quad (1)$$

A second equation (2) is used to calculate a second command value $T_{10}(t_1)*2$ from the value $\Delta T_{21}(t_1)$ and the first command value $T_{20}(t_1)*1$:

$$T_{10}(t_1)*2 = T_{10}(t_1)*1 + a \times \Delta T_{21}(t_1)/i \quad (2)$$

In the equation (2), a denotes an adjustment coefficient for a value of $\Delta T_{21}(t_1)$ and gives a value in a range from 0 to 1, preferably 0.5 to 0.7. In addition, i denotes a gear ratio. In this way, a deviation $\Delta T_{21}(t_1)$ of the output shaft torque of the specimen transmission is converted to deviation of the input shaft torque. Similarly, the second command value $T_{10}(t)*2$ is derived for times $t_2, t_3, —, t_m$.

The second command value $T_{10}(t_k)*2$ is supplied to the low inertia driving unit 3 as a torque command. When the system shown in FIG. 1 is driven, a second data $T_{22}(t_k)$ and $N_{12}(t_k)$ are derived.

Suppose that $t_1$ is representative, $t_1'$ which outputs $N_{12}(t_1')$ of the same frequency as $N_{10}(t_1)$ in the same way as in the first data is derived. A difference $\Delta T_{22}(t_1)$ between $T_{20}(t_1)$ and $T_{22}(t_1')$ at a time $t_1'$ is derived using the following equation (3):

$$\Delta T_{22}(t_1) = T_{20}(t_1) - T_{22}(t_1') \quad (3)$$

A third command value $T_{10}(t_1)*3$ is calculated from the following equation (4) using $\Delta T_{22}(t_1)$ and the second command value $T_{10}(t_1)*2$:

$$T_{10}(t_1)*3 = T_{10}(t_1)*2 + a \times \Delta T_{22}(t_1)/i \quad (4)$$

In this way, the deriving is repeated to derive data n number of times. When deriving this data, respective $\Delta T_{2n}(t_1), \Delta T_{2n}(t_2), \Delta T_{2n}(t_2), —, \Delta T_{2n}(t_m)$ give substantially zeros, i.e., when $|\Delta T_{2n}(t_k)| \leq b$ at any time (where b denotes a set value) and, torque detected values $T_{1n}(t_1), T_{1n}(t_2), —, T_{1n}(t_m)$ of the torque meter 2 at each time are estimated values of the input shaft torque of the specimen transmission during the driving in operation when using the reference data $T_{20}(t)$ and $N_{20}(t)$.

In the above described method, the input shaft torque is estimated on the basis of the input shaft revolutional speed of the specimen transmission and output shaft torque. Driving is carried out with the estimated value as the command value. On the basis of the driving result, the input shaft torque is again estimated. In this way, a learning operation is carried out so as to derive an unknown input shaft torque.

In this way, the estimation of the input shaft torque is carried out for each opening angle of the throttle valve. When, with the opening angle $\theta_i$ as the parameter, a relationship between the input shaft torque $T_1$ and the output shaft revolutional speed is derived, a graph shown in FIG. 3 is obtained.

Figure 3:
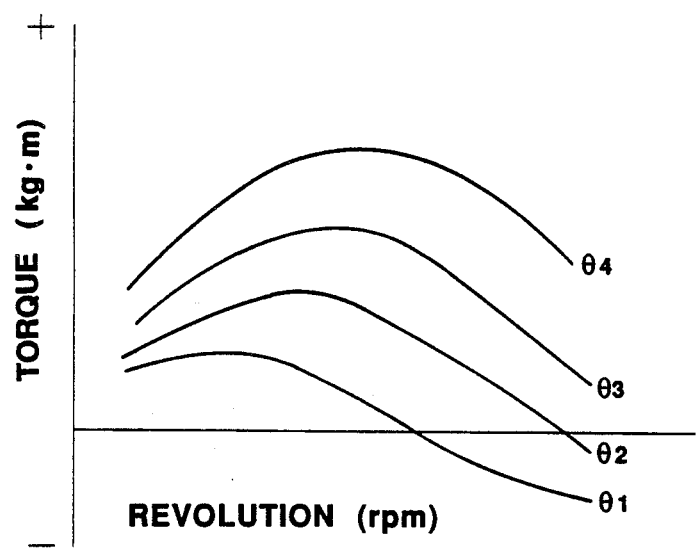
FIG. 3 is a characteristic graph representing examples of the engine output characteristics.

Hence, when the low inertia driving unit 3 is driven on the basis of the graph shown in FIG. 3 and the system is driven shown in FIG. 1 (A), testing equal to the actual system of intended use can be carried out, obtaining an actual shaft torque, to investigate driving characteristics of the specimen transmission.

As described above, the same or same type of specimen transmission from which the reference data is derived is used as the specimen transmission in the system shown in FIG. 1 (A). Load inertia is derived in the same way as the reference data described above.

Figure 4:
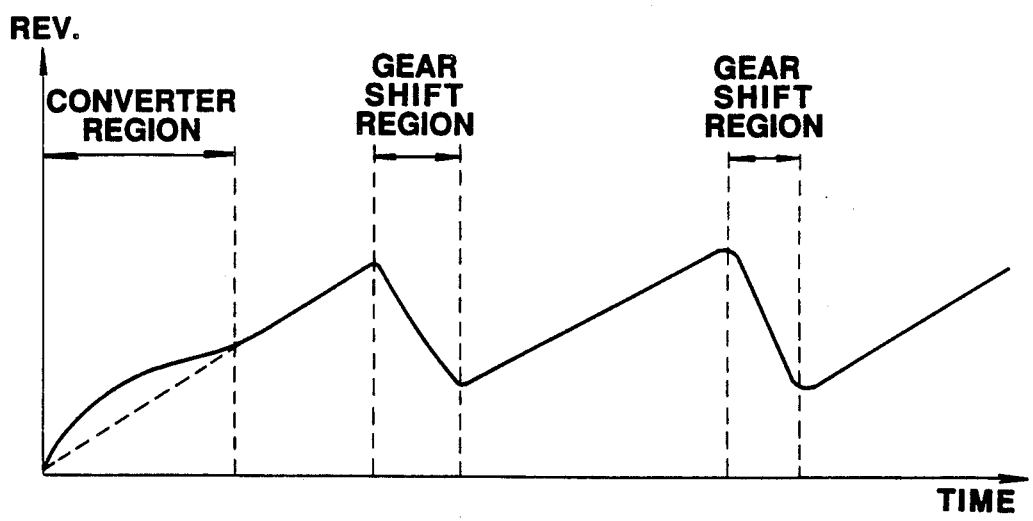
FIG. 4 is a characteristic graph of an engine revolutional speed with respect to time.

Reference data may be derived by increasing the revolutional speed or by decreasing the revolutional speed. When the learning operation is carried out, the revolutional direction is the same way as that used to obtain the reference data. In addition, since error easily occurs in a region such as a converter region or gear shift region in which a conversion efficiency is changed due to a torque converter action of the specimen transmission as shown in FIG. 4, the data is excluded with the range specified for such region.

Figure 5:
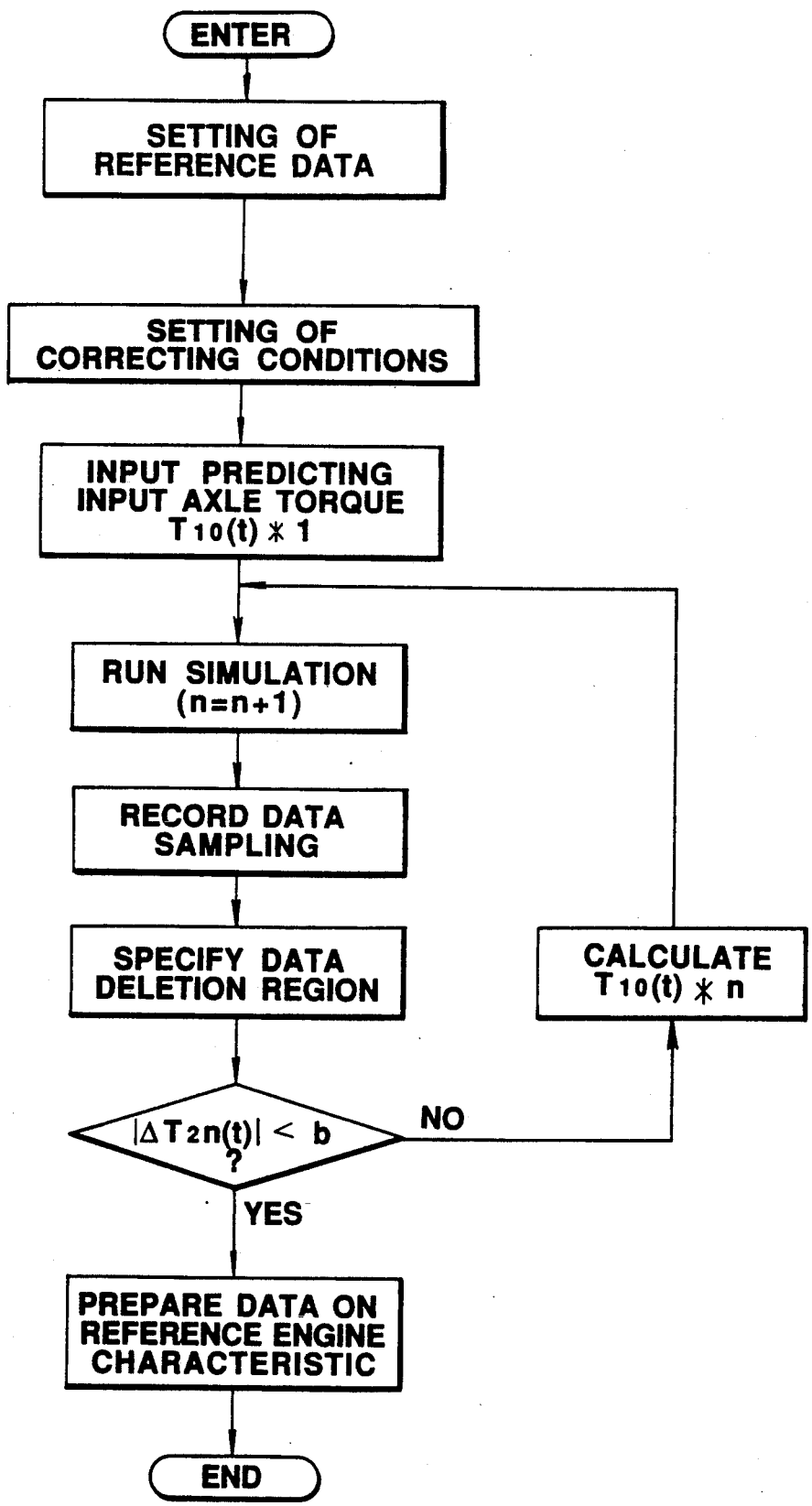
FIG. 5 is an operational flowchart explaining an operation executed by the system shown in FIG. 1.

FIG. 5 shows an operational flowchart executed until the data shown in FIG. 3 is derived by means of the learning operation.

In the flowchart shown in FIG. 5, the reference data $N_{10}(t)$ and $T_{20}(t)$ are first set in a computer. Then, the computer sets a correction coefficient a/i (refer to equations (2) and (4)) to convert the output shaft torque into the input shaft. Then, the predictive input shaft torque $T_{10}(t)*1$ is derived and input to the computer to carry out a first simulation driving. It is noted that $T_{10}(t)*1$ is time series data of predictive values at each of times $t_1$ through $t_m$. Next, the values of the input shaft revolutional speed and output shaft torque at respective times $t_1$ to $t_m$ are sampled and recorded. Thereafter, a data erasure or deletion area is specified each time $T_{2n}(t)$ is derived. Then, the computer determines whether all of $|\Delta T_{2n}(t)|$ are smaller than the set value b. If it is smaller, the torque detected value of the torque meter 2 at each time is the input shaft torque when the reference data is derived. The reference engine characteristic data shown in FIG. 3 is prepared. In addition, if any one of the values of $|T_{2n}(t)|$ indicate a value equal to b or more, the second torque command value $T_{10}(t)*2$ is calculated to perform the second simulation, and the same processing is carried out.

Although in the above described example the data is derived for each opening angle of the throttle valve, the data may be derived for each parameter value, for example, intake manifold pressure, and so forth.

In addition, specifying a data erasure area may include a method in which the erasure area varies over time for input shaft revolutional speed, output shaft revolutional speed, and output shaft torque, i.e., $N_1(t)$, $N_2(t)$, and $T_2(t)$ are displayed on a screen of a CRT (Cathode Ray Tube) (where N denotes an integer) and a cursor is used to specify the data erasure area, a method in which a region of a speed ratio $N_2 \cdot i/N_1 \leq K$ (K denotes a constant such as 0.9) is automatically eliminated, and a method in which a space of time in which an external signal is input is automatically eliminated.

Figure 6:
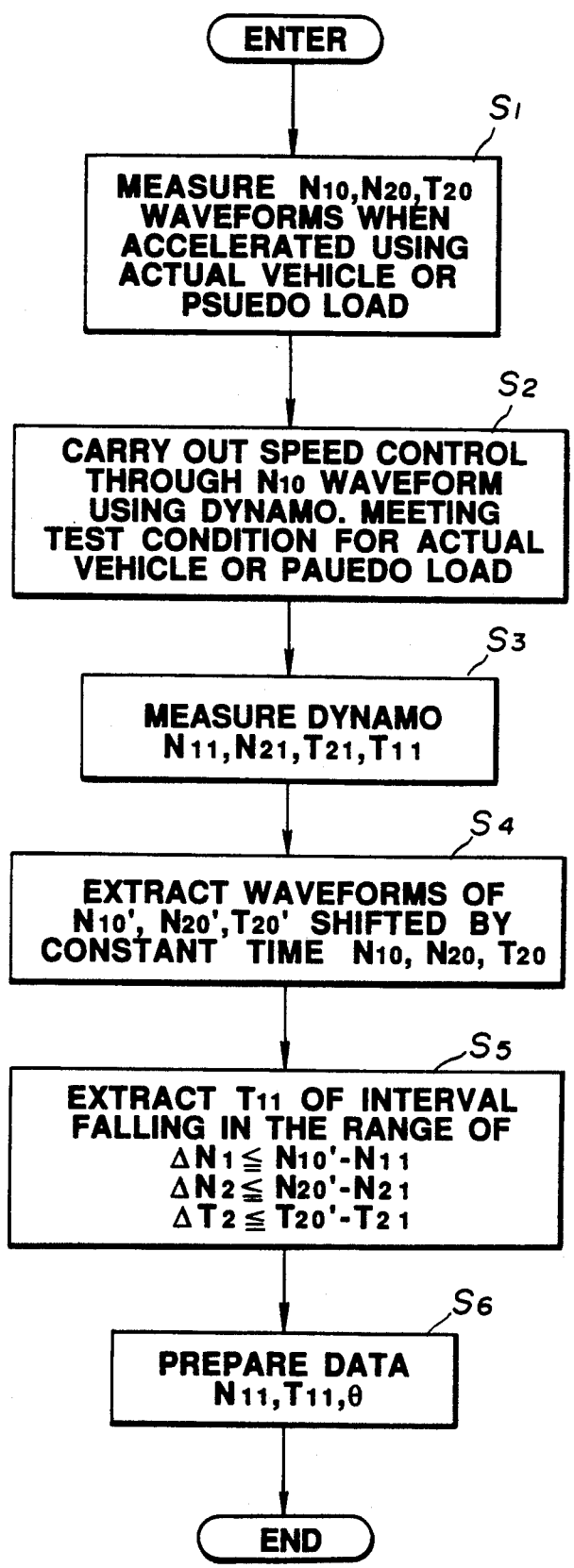
FIG. 6 is an operational flowchart explaining an analyzing procedure in the second preferred embodiment according to the present invention.
Figure 7A:
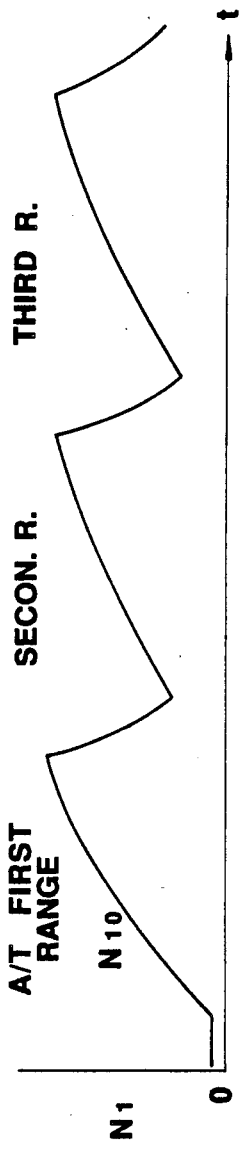
FIGS. 7 (A) through 7 (D) are waveform charts of accelerations in a case when an actual vehicle is tested in the second preferred embodiment.
Figure 7B:
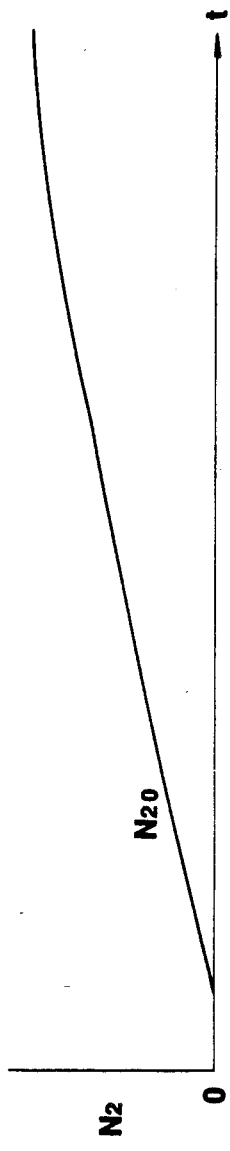
Figure 7C:
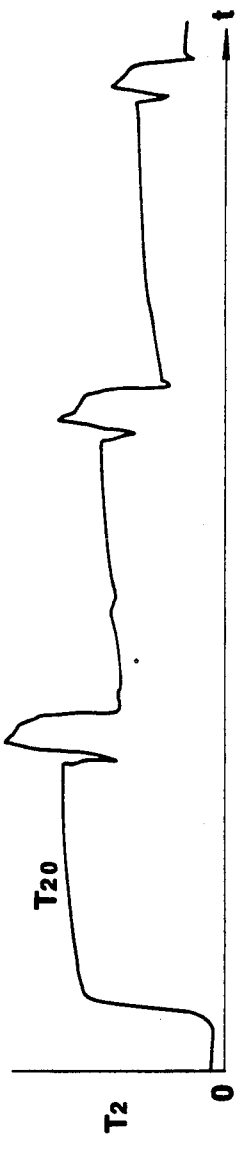
Figure 7D:
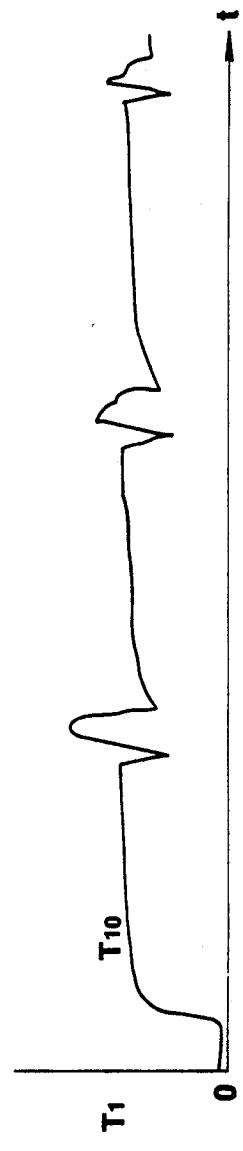

FIG. 6 shows an operational flowchart of analyzing an procedure in a second preferred embodiment according to the present invention.

In a step $S_1$, with the engine 11 and specimen transmission 12 connected to the energy absorbing dynamometer 14 as the pesudo load and flywheel 15 as shown in FIG. 1 (B), waveforms of the engine revolutional speed $N_1$, output shaft revolutional speed $N_2$ of the automatic transmission 12 and output shaft torque $T_2$ when the opening angle of the throttle valve of the engine 11 is accelerated from $\theta_o$ to a testing opening angle $\theta_1$ are measured. The waveform example at this time is observed for the gear ranges of the automatic transmission (e.g. 1st through 3rd) as shown in FIGS. 7 (A) through 7 (D). The output shaft torque $T_2$ also provides a particular behavior accompanied with a torque shock during shift change. In FIGS. 7 (A) through 7 (D), $T_1$ denotes a torque predicted waveform of the engine output shaft.

Figure 9:
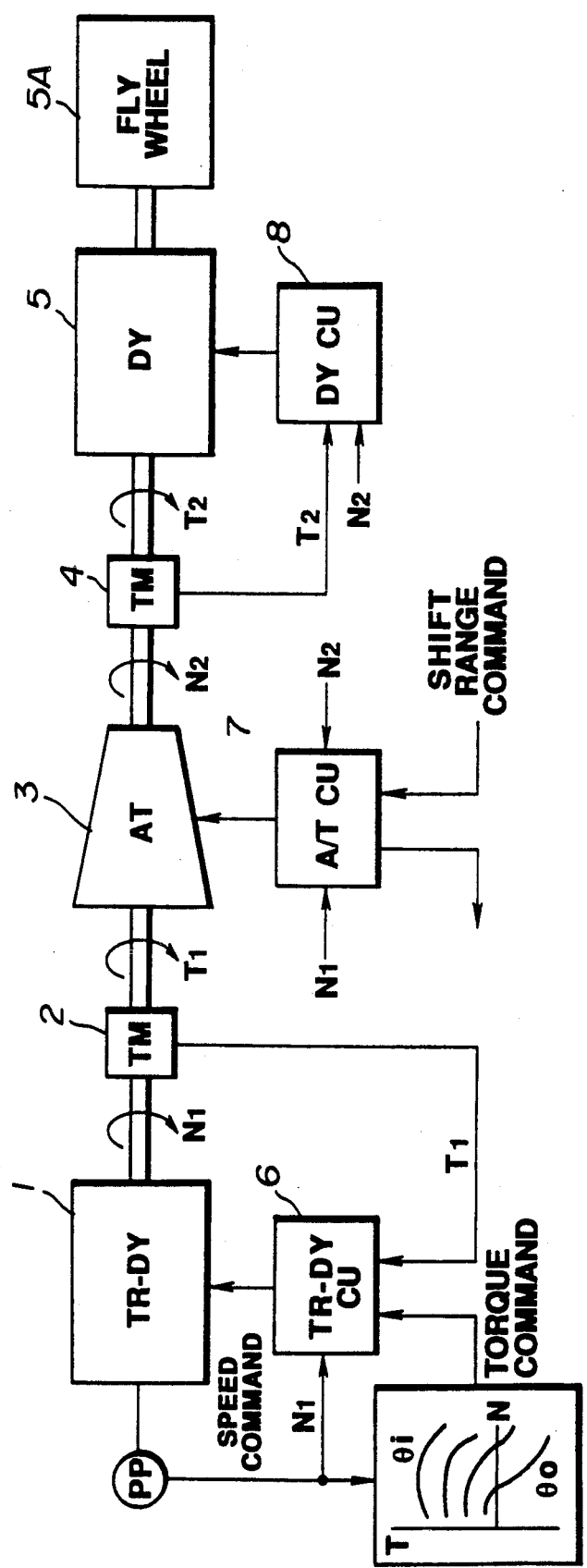
FIG. 9 is a schematic block diagram of a previously proposed transient dynamometer explained in the background of the invention.

It is noted that the structure shown in FIG. 1 (B) and FIG. 9 is exemplified by U.S. patent application Ser. No. 427,031 filed on Oct. 25, 1989 (which corresponds to European Patent Application No. 89311002.3 filed on Oct. 25, 1989 and published as No. 0366446), the disclosure of which is herein incorporated by reference.

The waveform charts $N_{10}$, $N_{20}$, and $T_{20}$ of data $N_1$, $N_2$, and $T_2$ caused by the pseudo load in the step $S_1$ may be derived from the actual measurement values of the vehicle.

Next, in the construction of the dynamometer of FIG. 9, the testing conditions of both energy absorbing dynamometer 5 and flywheel 5A are met with the actual vehicle or pseudo load, the same as those in measuring the step of step $S_1$. The specimen 3 is the same or same type of automatic transmission 12. The TR-DY control unit 6 carries out the speed control for the low inertia driving unit 1 with the waveform data $N_{10}$ in the step $S_1$ being the speed command $N_{11}$. In the speed control in the step $S_2$, the output torque $T_{11}$ of the low inertia driving unit 1 with the waveform data $N_{10}$ in the step $S_1$ is the speed command $N_{11}$. In the speed control at the step $S_1$, the output torque $T_{11}$ of the low inertia driving unit 1 is measured with respect to the change in the speed $N_{11}$, output torque $T_{21}$ of the specimen transmission 3, and revolutional speed $N_{21}$. The waveform charts measured at this time are shown with $N_{10}$, $N_{20}$, $T_{20}$ and $T_{10}$, measured in the step $S_1$ overlapped, in FIGS. 8 (A) through 8 (D).

The measured waveforms in the step $S_3$ are measured substantially in an analogous form in which a time axis is shifted by a control response delay of the transient dynamometer as compared with the waveform chart of the pseudo load, in the construction shown in FIG. 1 (B).

Next, in a step $S_4$, the waveform data $N_{10}'$, $N_{20}'$, and $T_{20}'$ which are deviated from the waveform charts $N_{10}$, $N_{20}$, and $T_{20}$ measured in the step $S_4$ by constant times (normally, 0.1 seconds to 0.5 seconds) are derived so that, in a step $S_5$, respective deviations are derived between the measured data $N_{11}$, $N_{21}$, $T_{21}$ in the step $S_3$. Then, an output torque $T_{11}$ during an interval within an allowance value previously set is extracted. The extracted torque $T_{11}$ is derived at the throttle valve opening angle $\theta_1$ from the engine revolutional speed $N_{11}$ and throttle opening angle $\theta_1$. This is used as an engine characteristic generator 9 data in a step $S_6$. It is noted that the torque data $T_{11}$ at an interval in which the data does not fall within the allowed deviations $N_1$, $N_2$, and $T_2$ is determined by means of a straight line interpolation between the torque data $T_{11}$ which falls in the allowance deviation.

The processings in the steps $S_1$ through $S_6$ are caused by the analysis of the output torque $t_{11}$ at the throttle opening angle $\theta_1$. Subsequently, the same processings are carried out for the other opening angles $\theta_o$ through $\theta_n$. The engine characteristics are determined for the respective speeds for the opening angles of the throttle valves $\theta_o$ through $\theta_n$.

In the analyzing procedure according to the present invention, the testing conditions and engine revolutional speed (low inertia driving unit speed) are obtained substantially the same as the actual vehicle under operating conditions. These are derived by carrying out the speed control through the dynamometer which meets the testing condition for the data $N_{10}$, $N_{20}$, and $T_{20}$ on the testing condition in which the engine is connected to the automatic transmission in an actual vehicle or under a pseudo load. The same engine characteristics as the behavior of the actual vehicle are derived by limiting the data $N_{11}$, $N_{21}$, and $T_{21}$ and each deviated value to fall within a certain range within the allowance value. The same engine characteristics as the behavior of the actual vehicle can be derived by estimating and extracting the torque $T_{11}$ in the interval as the output torque of the engine.

It is noted that as in the actual analyzing operation, measurement in the step $S_1$ is integrally measured for the opening angles $\theta_o$ through $\theta_n$ to store the data at each throttle valve opening angle. Then, measurements using the transient dynamometer in the steps $S_2$ through $S_6$ and data processing are integrally made for respective throttle valve opening angles. Consequently, operation is simplified.

In addition, although the method for analyzing engine output characteristics in a case when the automatic transmission is tested is shown in the second preferred embodiment, this method can be applied to analysis of output characteristics of another dynamometer in a case where the engine characteristic generator data in the chassis dynamometer is derived.

As described hereinabove, in the first preferred embodiment, the learning operation is carried out in the system in which the low inertia driving unit is used on the basis of the input shaft revolutional speed or output shaft revolutional speed of the power transmission and the output shaft torque of the power transmission in the system in which the engine is connected to the power transmission so that the unknown input shaft torque of the power transmission is estimated. The input shaft torque of the power transmission in the system using the engine can accurately be recognized. Then, for example, if the low inertia driving unit is driven with the estimated input shaft torque value as the torque command, testing equal to the system in which the engine is used can be executed grasping the input shaft torque of the power transmission. Hence, the characteristic analysis and evaluation of the specimen power transmission can be carried out with high reliability. In addition, troublshooting of the power transmission can accurately be carried out.

Furthermore, since, in the second preferred embodiment, of waveform measurement of the behavior of the power transmission connected to the vehicular engine used in the system using the actual vehicle or under pseudo load are carred out, waveform measurement of the behaviors of the DC motor and power transmission when a dynamometer having the same testing condition is used to matach the speed change with that in the case of the engine connection are carried out, and the output torque of the DC motor in an interval in which both measured waveforms become analogous to each other is estimated as the engine output torque. Analysis of engine output characteristic and engine output characteristic data which accords with the actual behavior of a power transmission and engine actually mounted in a vehicle can be executed.

It will fully be appreciated by those skilled in the art that the foregoing description is made in terms of the preferred embodiments and various changes and modifications may be made in terms of the preferred embodiments which are to be defined by the appended claims.

What is claimed is:

1. A method for testing engine output characteristics of an engine connected with a vehicular power transmission, comprising the steps of:
   (a) measuring an engine operating parameter;
   (b) measuring at least a first revolutional speed on an input or output shaft of a power transmission connected to said engine and a first output torque of the power transmission when the engine operating parameter indicates a predetermined value;
   (c) measuring a second revolutional speed on the input or output shaft of the power transmission and second output torque of the power transmission when a low inertia driving unit having the same characteristic as the engine is connected and driven with the power transmission under the same operating parameter measured in the step (a);
   (d) measuring a first drive torque of the low inertia driving unit in the state of step (c);
   (e) measuring a third revolutional speed on the input or output shaft of the power transmission and a third output torque of the power transmission when a predetermined time has elapsed after the step (c) and the same low inertia driving unit is connected and driven in the same way as in the step (c); and
   (f) measuring a second drive torque of the low inertia driving unit when a difference in the values of the second and third revolutional speeds and second and third output torques fall within a predetermined range, the second drive torque being estimated as the output characteristic of the engine connected to the power transmission.

2. A method as set forth in claim 1, wherein step (b) comprises the step of (g) deriving first and second reference data, the first reference data $T_{20}(t)$ being data on a change of the output shaft of the power transmission with time for each engine operating parameter value and the second reference data $N_{10}(t)$ being data on a change of the revolutional speed of the input shaft of the power transmission over time for each engine operating parameter value, both first and second reference data being derived with the power transmission connected to the vehicular engine.

3. A method as set forth in claim 2, wherein the step (e) comprises the steps of:
   (h) calculating a first target value data $T_{10}(t)*1$ of an output shaft torque of the low inertia driving unit which would provide a torque which would output the first and second reference data from the power transmission when the engine operating parameter indicates the predetermined value on the basis of a gear shift ratio of the power transmission and predictive slip rate of a torque converter of the power transmission and producing a torque command to the low inertia driving unit, the torque command indicating the calculated first target value; and
   (i) deriving a second data $T_{21}(t)$ representing the change in the output shaft torque of the power transmission over time and a third data $N_{11}(t)$ representing the change in input shaft revolutional speed of the power transmission with time when the low inertia driving unit is driven with the torque command, the second data $T_{21}(t)$ at a time $t_k$ (where k denotes an integer) being represented by $T_{21}(t_k)$ and the third data $N_{11}(t)$ at a time $t_k$ being represented by $N_{11}(t_k)$.

4. A method as set forth in claim 3, wherein the step (e) comprises the steps of:
   (j) deriving a time (t') at which the input shaft revolutional speed $N_{11}(t')$ has the same value as the second reference value $N_{10}(t)$ and deriving the second data $T_{21}(t)$ at a time $(t_2)$ and deriving the second $T_{21}(t')$ at a time (t');
   (k) determining whether a difference exists between the second reference data $T_{20}(t_1)$ and output torque data $T_{21}(t')$ at the time (t');
   (l) deriving a second target value of the output torque using the difference and the first target value $T_{10}(t_1)*1$ if a difference exists in the step (k); and
   (m) providing a second target torque command of $T_{10}(t')*2$ and repeating the steps (j) through (l).

5. A method as set forth in claim 4, wherein the step (f) comprises the steps of:
   (n) deriving the second data on the output torque of the power transmission at times $(t_1, t_2, ---, t_m)$ when the step (e) is carried out n number of times $(T_{2n}(t_1), T_{2n}(t_2), ---, T_{2n}(t_m))$;
   (o) determining whether the first difference value $(\Delta T_{2n}(t_1), \Delta T_{2n}(t_2), ---, \Delta T_{2n}(T_m))$ at each time $(t_1, t_2, ---, t_m)$ indicates substantially zero, i.e., $|\Delta T_{2n}(t_k)| \leq b$ (b=a value of the range of limit); and
   (p) deriving a value of output torque of the low inertial driving unit at each time, i.e., $T_{1n}(t_1), T_{1n}(t_2), ---, T_{2n}(t_m)$ if it is determined in the step (o) that $|\Delta T_{2n}(t_k)| \leq b$ as an estimated value of the input shaft torque of the power transmission when the first and second reference data $T_{20}(t), N_{20}(t)$ are derived in the step (b).

6. A method as set forth in claim 5, wherein a torque meauring sensor is provided on the output shaft of the low inertia driving unit connected to the input shaft of the power transmission.

7. A method as set forth in claim 6, wherein the engine operating parameter is an opening angle of an engine throttle valve.

8. A method as set forth in claim 6, wherein a torque measuring sensor is provided on the output shaft of the power transmission connected to a dynamometer and flywheel.

9. A method as set forth in claim 4, wherein in the step (k), the difference value is expressed as follows: $\Delta T_{21}(t_1) = T_{20}(t_1) - T_{21}(t_1')$ and in the step (l) the second target value is derived as follows: $T_{10}(t_1)*2 = T_{10}(t_1)*1 + a \times \Delta T_{21}(t_1)/i$, wherein a denotes an adjustment coefficient to a value of $T_{21}(t_1)$ and i denotes a gear ratio of the power transmission, and in the same way the second target value for each time except the time $t_1$ ($t_2$, $T_3$, - - -, $t_m$) is derived.

10. A method as set forth in claim 1, wherein the step (b) comprises the steps of:
  (g) providing an engine corresponding to the power transmission to connect to the power transmission and providing a pseudo load for the power tranmission; and
  (h) measuring behaviors of the engine revolutional speed $N_1$, output shaft revolutional speed $N_2$ of the power transmission, and output shaft torque $T_2$ of the power transmission through their waveforms $N_{10}$, $N_{20}$, and $T_{20}$ when the engine is accelerated from an opening angle during engine idling to the predetermined value $\theta_1$.

11. A method as set forth in claim 10, wherein the steps (c) and (d) comprise the steps of:
  (i) providing the low inertia driving unit to connect to the power transmission in place of the engine and providing a torque measuring sensor on the output shaft of the low inertia driving unit and matching the testing condition of the step (g); and
  (j) measuring the output torque $T_{11}$ of the low inertia driving unit with respect to a change in the revolutional speed $N_{11}$ derived in the step (h) with the low inertia driving unit controlled, the data $N_{11}$ being the speed command to the low inertia drivng unit, and measuring the output torque $T_{21}$ of the low inertia driving unit and revolutional speed $N_{21}$ of the output shaft of the power transmission.

12. A method as set forth in claim 11, wherein the step (e) comprises the step of:
  (k) deriving waveform data $N_{10}'$, $N_{20}'$, and $T_{20}'$ deviated by the predetermined time from the measured waveform data $N_{10}$, $N_{20}$, and $T_{20}$ measured in the step (h).

13. A method as set forth in claim 12, wherein the step (f) comprises the steps of:
  (l) deriving each difference value between the measured waveform data, i.e., $N_{11}$ and $N_{10}'$, $N_{21}$ and $N_{20}'$, and $T_{21}$ and $T_{20}'$;
  (m) determining whether each difference value falls within the predetermined limit range; and
  (n) extracting the second drive torque $T_{11}$ when each difference value falls within the predetermined limit range, the extracted second drive torque being the output torque $T_{11}$ of the engine when the opening angle of the throttle valve indicates the predetermined value $\theta_1$.

14. A method as set forth in claim 13, wherein the same steps (l) through (n) are repeated for other opening angles of the throttle valve $\theta_o$ through $\theta_n$, n denoting an integer.

15. A method as set forth in claim 14, wherein the output torque $T_{11}$ derived when each difference value does not fall within the predetermined limit range is derived by linear interpolation with the output torque derived when each difference value falls within the predetermined limit range.

16. A method as set forth in claim 15, wherein the data of the output torque $T_{11}$ derived in the step (n) is stored in an engine characteristic generator installed together with the low inertia driving unit.

17. A system for testing an engine output characteristic of an engine connected with a vehicular power transmission a low inertia driving unit, comprising:
  (a) first means for measuring an engine operating parameter;
  (b) second means for measuring at least a first revolutional speed on an input or output shaft of a power transmission connected to said engine and a first output torque of the power transmission when the engine operating parameter indicates a predetermined value;
  (c) a low inertia driving unit having the same characteristic as the engine;
  (d) third means for measuring a second revolutional speed on the input or output shaft of the power transmission and second output torque of the power transmission when said low inertia driving unit is connected and driven with the power transmission under the same operating parameter measured in the step (a);
  (e) fourth means for measuring a first drive torque of the low inertia driving unit in the state of step (d);
  (f) fifth means for measuring at a third revolutional speed on the input or output shaft of the power transmission and a third output torque of the power transmission when a predetermined time has elapsed after the step (d) and the same low inertia driving unit is connected and driven in the same way as the step (d); and
  (g) sixth means for measuring a second drive torque of the low inertia driving unit when a difference in the values of the second and third revolutional speeds and second and third output torques fall within a predetermined range, the second drive torque being estimated as the output characteristic of the engine connected to the power transmission.

* * * * *